(12) United States Patent
Farniok et al.

(10) Patent No.: US 10,591,288 B2
(45) Date of Patent: Mar. 17, 2020

(54) SYSTEM AND METHOD FOR EVALUATION OF USED COMPONENTS

(71) Applicant: THE BOEING COMPANY, Chicago, IL (US)

(72) Inventors: Craig Martin Farniok, Godfrey, IL (US); William Talion Edwards, Wentzville, MO (US); Daniel Ray Trapp, Orange Park, FL (US)

(73) Assignee: THE BOEING COMPANY, Chicago, IL (US)

( * ) Notice: Subject to any disclaimer, the term of this patent is extended or adjusted under 35 U.S.C. 154(b) by 430 days.

(21) Appl. No.: 15/635,082

(22) Filed: Jun. 27, 2017

(65) Prior Publication Data
US 2018/0372486 A1    Dec. 27, 2018

(51) Int. Cl.
| | |
|---|---|
| G01B 21/02 | (2006.01) |
| B64F 5/60 | (2017.01) |
| B64F 5/40 | (2017.01) |
| G01B 11/16 | (2006.01) |
| G01B 11/00 | (2006.01) |
| G06Q 10/00 | (2012.01) |

(52) U.S. Cl.
CPC .............. *G01B 21/02* (2013.01); *B64F 5/40* (2017.01); *B64F 5/60* (2017.01); *G01B 11/16* (2013.01); *G06Q 10/20* (2013.01); *G01B 11/002* (2013.01)

(58) Field of Classification Search
CPC ...... G01B 21/02; G01B 11/16; G01B 11/002; B64F 5/60; B64F 5/40; G06Q 10/20
See application file for complete search history.

(56) References Cited

U.S. PATENT DOCUMENTS 6,226,597 B1 * 5/2001 Eastman ................ G06Q 10/20
                                                                702/34
8,548,619 B2 * 10/2013 Richey ................. G05B 19/401
                                                                700/98

(Continued)

FOREIGN PATENT DOCUMENTS

| CN | 104778742 A | 7/2015 |
|---|---|---|
| EP | 3264341 A1 | 1/2018 |

(Continued)

OTHER PUBLICATIONS

Stark et al., "Product analysis automation for digital MRO based on intelligent 3D data acquisition", CIRP Annals—Manufacturing Technology 62 (2013) 123-126 (Year: 2013).*

(Continued)

*Primary Examiner* — Regis J Betsch
(74) *Attorney, Agent, or Firm* — Moore IP Law (57) ABSTRACT

A method includes receiving three-dimensional (3D) measurement data based on a measurement of a first used component of a particular component type. The method also includes performing a comparison of the 3D measurement data to in-service tolerances associated with the particular component type, the in-service tolerances determined based on a measurement of at least a second used component of the particular component type and an evaluation of structural characteristics of the second used component. The method further includes generating, based on the comparison, an output indicating whether the first used component is acceptable for reuse.

20 Claims, 6 Drawing Sheets

(56) References Cited

U.S. PATENT DOCUMENTS

| | | |
|---|---|---|
| 8,849,636 B2 | 9/2014 | Becker et al. |
| 2007/0010923 A1 | 1/2007 | Rouyre |
| 2007/0061109 A1 | 3/2007 | Wilke et al. |
| 2011/0054806 A1* | 3/2011 | Goldfine ................. G07C 3/00 |
| | | 702/34 |
| 2013/0166458 A1 | 6/2013 | Wallner et al. |
| 2017/0248940 A1* | 8/2017 | Regnault .......... G05B 19/41805 |

FOREIGN PATENT DOCUMENTS

| | | | |
|---|---|---|---|
| WO | 2016053743 A1 | 4/2016 | |
| WO | WO-2016053743 A1 * | 4/2016 | ........... G01N 17/043 |

OTHER PUBLICATIONS

Chisholm, S. A. et al., "Forty Years of Structural Durability and Damage Tolerance at Boeing Commercial Airplanes," Boeing Technical Journal, 2016, <http://www.boeing.com/features/innovation-quarterly/may2017/feature-technical-structural-durability.page>, pp. 1-24.

Extended European Search Report for Application No. 18172171.3 dated Aug. 7, 2018, 11 pgs.

Laser Design Inc., "3D Laser Scanning Ensures Accuracy and Safety of Free-form Turbine Blades", Apr. 25, 2017, 8 pages.

Optical Gaging Products (OGP), "Assess How a Part Changes Over Time Using a 3D Laser Scanner", 2016, 2 pages.

\* cited by examiner

SYSTEM AND METHOD FOR EVALUATION OF USED COMPONENTS

FIELD OF THE DISCLOSURE

The present disclosure is generally related to evaluating used components.

BACKGROUND

During structural inspection and maintenance of aircraft, aircraft components are inspected, measured, and compared to pre-determined (e.g., original or as-designed) allowable limits, such as design tolerances. For example, a component is measured by hand by a maintenance technician using measuring tools (e.g., calipers, micrometers, scales, hull gauges, etc.). The measurements are compared to design tolerances (e.g., design tolerances indicated by 3D models or 2D blueprints) of the component. If the measurements are not within the design tolerances, the measurements are sent to structural engineers (who may be offsite) for analysis. The analysis may indicate that the component is to be reused, repaired, or scrapped. Additionally, because of the complexity of the analysis, the structural engineers may request more measurements to complete the analysis, which extends the inspection and maintenance cycle time. This structural inspection and maintenance process is time consuming and enables little to no reuse of the complex analysis done for the component or for similar components of the same type.

SUMMARY

In a particular implementation, a method includes receiving three-dimensional (3D) measurement data based on a measurement of a first used component of a particular component type. The method also includes performing a comparison of the 3D measurement data to in-service tolerances associated with the particular component type, the in-service tolerances determined based on a measurement of at least a second used component of the particular component type and an evaluation of structural characteristics of the second used component. The method further includes generating, based on the comparison, an output indicating whether the first used component is acceptable for reuse.

In another particular implementation, a system includes a measuring device and a computing device. The measuring device is configured to generate 3D measurement data based on a measurement of a first used component of a particular component type. The computing device is configured to perform a comparison of the 3D measurement data to in-service tolerances associated with the particular component type, the in-service tolerances determined based on measurement of at least a second used component of the particular component type and evaluation of structural characteristics of the second used component. The computing device is further configured to generate, based on the comparison, an output indicating whether the first used component is acceptable for reuse.

In another particular implementation, a non-transitory processor-readable medium stores processor-executable instructions that, when executed by a processor, cause the processor to receive 3D measurement data based on scanning a first used component of a particular component type. The instructions also cause the processor to perform a comparison of the 3D measurement data to in-service tolerances associated with the particular component type, the in-service tolerances determined based on measurement of at least a second used component of the particular component type and evaluation of structural characteristics of the second used component. The instructions further cause the processor to generate, based on the comparison, an output indicating whether the first used component is acceptable for reuse.

DETAILED DESCRIPTION

Implementations described herein are directed to a system and method for inspection and maintenance of components of a platform. The platform includes or corresponds to an aircraft, a spacecraft, a ship, a building, a bridge, an oil rig, a power plant, a chemical plant, etc. A measuring device (e.g., a three dimensional (3D) laser scanner) scans a particular component of the platform to generate 3D measurement data (e.g., a point cloud). By using a measuring device (e.g., an automated measuring device) to determine the 3D measurement data, an accuracy of the measurements of the particular component is increased (e.g., reduces human error) and more measurement data can be generated within a particular period of time as compared to measuring by hand. Additionally, using a measuring device to determine the 3D measurement data may reduce occurrences of remeasuring the particular component because of incomplete data. Accordingly, an accuracy of models and simulations of the components, generated based on the 3D measurement data, is increased and inspection and maintenance cycle time may be decreased.

In addition, the 3D measurement data may include metadata, such as location information (e.g., a location where the measurements were taken), component identification information, platform identification information, timestamp information, etc. The metadata may enable storage, retrieval, and reuse of the 3D measurement data. For example, the metadata may enable the 3D measurement data to be utilized to reduce occurrences of measuring the component at future maintenance and inspection intervals or to predict in-service tolerances for new components with no maintenance history.

In a particular implementation, a computer receives the 3D measurement data of the particular component and performs a comparison of the 3D measurement data (or a 3D model generated based on the 3D measurement data) to in-service tolerances. The in-service tolerances are generated after original, as-designed tolerances and based on measurements and evaluations of one or more components that are similar to the particular component (e.g., the same component type). Thus, the in-service tolerances represent deviations from the original, as-designed tolerances. For example, the in-service tolerances are generated at least based on a structural analysis of a second particular component of a similar platform (e.g., the same platform type). To illustrate, second 3D measurement data of the second particular component is used to generate a second 3D model of the second particular component. Static strength and fatigue simulations are performed on the second 3D model of the second particular component and the results are compared to operational characteristics (e.g., load and fatigue) of the part. Additionally, the in-service tolerances for the particular component (e.g., the component type) are updated based on structural analysis of other similar components of the component type.

The computer generates, based on the comparison, an output that indicates a disposition of the particular component. For example, the computer generates an output indicating that the particular component is acceptable for reuse in the platform, that the particular component is to be evaluated, that the particular component is to be repaired, or that the particular component is to be scrapped.

If the particular component is acceptable for reuse, the particular component is installed (e.g., reinstalled) on the platform or a similar platform. A simulation of the 3D model of the component (or a test of the particular component) is not performed because the particular component complies with in-service tolerances generated based on simulations or testing of other components of the same type. By using in-service tolerances, an amount of evaluations (e.g., simulated analysis of 3D models or tests of physical components) of components may be reduced, and inspection and maintenance cycle time may be decreased.

If the output indicates that the particular component is to be evaluated, a 3D model of the particular component is generated, and static strength and fatigue simulations are performed on the 3D model of the particular component. The results of the evaluation are compared to operational characteristics (e.g., load and fatigue) of the particular component and the in-service tolerances may be updated based on the result (e.g., if the particular component meets or exceeds the performance requirements).

If the output indicates that the particular component is to be repaired, the particular component may be scanned (e.g., rescanned) after the repair is performed to determine whether the repaired component is compliant with the in-service tolerances. The in-service tolerances may be stored on a server or in a database and be accessible to maintenance personnel at multiple locations to enable the multiple locations to utilize up to date in-service tolerances.

Figure 1:
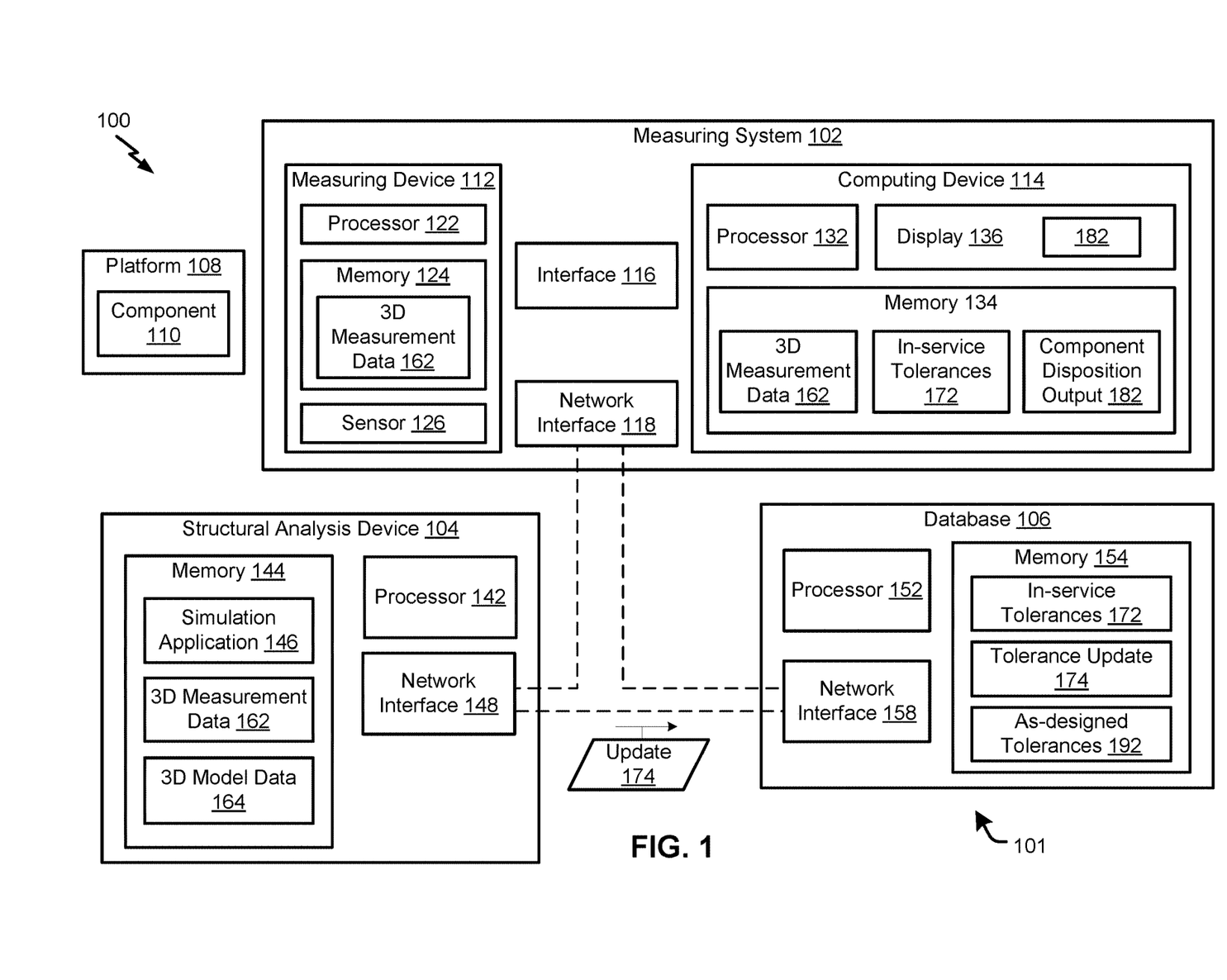
FIG. 1 is a block diagram that illustrates an example of a system for evaluating a component for reuse.

FIG. 1 illustrates an example of a diagram 100 of system 101 for evaluating used components for re-use in a platform. The system 101 may enable evaluation of used components, generation of in-service tolerances, and updating of the in-service tolerances. The system 101 includes a measuring system 102, a structural analysis device 104, and a database 106. FIG. 1 depicts an example of the system 101 evaluating a component 110 of a platform 108. Although one measuring system and one structural analysis device are illustrated in FIG. 1, in other implementations, the system 101 includes multiple measuring systems and multiple structural analysis devices.

The component 110 is a used component that includes deviations from an original as-designed or manufactured component (e.g., an unused component). To illustrate, the component 110 has wear, damage, or both, causing variance from the as-designed component and as-designed tolerances 192. The platform 108 includes or corresponds a complex system with multiple components, including the component 110, and has relatively long operational life. One or more of the multiple components of the platform 108 may have an operational life that is less than the operational life of the platform 108 or may incur damage or wear during operation of the platform 108. Accordingly, one or more of the multiple components are evaluated and replaced over the operational life of the platform 108. As illustrative examples, the platform 108 may include or correspond to an aircraft, a spacecraft, a ship, a building, a bridge, an oil rig, a power plant, or a chemical plant.

The measuring system 102 includes a measuring device 112 and a computing device 114 configured to be coupled via an interface 116. The measuring device 112 (e.g., a 3D measuring device) includes a processor 122, a memory 124, and a sensor 126. The memory 124 is configured to store 3D measurement data 162 generated by the measuring device 112. The measuring device 112 is configured to measure the component 110 using the sensor 126 and to generate the 3D measurement data 162. The measuring device 112 includes or corresponds to 3D laser scanning device, a contact measurement device, an optical measurement device, coordinate measuring machine, an electronic bore gauge, or a combination thereof. The measuring device 112 may be fixed, portable, or handheld, and may include wired communication capabilities, wireless communication capabilities, or both. In some implementations, the measuring device 112 is configured to measure the component 110 while the component 110 is installed on the platform 108. In other implementations, the measuring device 112 is configured to measure the component 110 after the component 110 has been partially uninstalled or completely uninstalled from the platform 108. In a particular implementation, the 3D measurement data 162 generated by the measuring device 112 includes or corresponds to a point cloud. In other implementations, the 3D measurement data 162 may include or correspond to probe measurements or scan data.

In some implementations, the 3D measurement data 162 includes metadata, such as location information (e.g., a location where the measurements were taken), component identification information, platform identification information, timestamp information, etc. The metadata may enable storage, retrieval, and reuse of the 3D measurement data 162. For example, the 3D measurement data 162 may be reused for future evaluations of the component 110 based on at least the component identification information. As another example, the 3D measurement data 162 may be compared with updated 3D measurement data, which is generated based on measuring (e.g., remeasuring) the component 110, based on at least the component identification information. Additionally, the 3D measurement data 162 may also be utilized to generate in-service tolerances for a new component type that is similar to the component 110 based at least on the component identification information and the platform identification information.

The computing device 114 is configured to receive the 3D measurement data 162 via the interface 116. The interface 116 is configured to transfer data between the measuring device 112 and the computing device 114. The interface 116 may include or correspond to a wireless interface or a wired interface of the computing device 114. In a particular implementation, the interface 116 is an input/output (I/O) interface, such as universal serial bus (USB) interface.

The computing device 114 includes a processor 132, a memory 134, and a display 136. The memory 134 is configured to store the 3D measurement data 162, in-service tolerances 172, and a component disposition output 182.

The in-service tolerances 172 include in-service tolerances for multiple types of components and platforms. For example, a particular set of in-services tolerances of the in-service tolerances 172 corresponds to a particular type of component of one or more platforms. The in-service tolerances 172 include dimensional tolerances of the component 110, such as length tolerances, width tolerances, height tolerances, area tolerances, volume tolerances, or a combination thereof. In some implementations, the in-service tolerances 172 includes tolerances for overall dimensions (e.g., exterior dimensions) of the component 110, for dimensions of sub-components (e.g., interior dimensions) of the component 110, or a combination thereof. The in-service tolerances 172 may include a value (e.g., a positive value threshold or a negative value threshold) or range of values (e.g., 0.997 to 1.003, commonly referred to as 1 inch + or −0.003 inches), or a combination thereof.

Additionally or alternatively, the in-service tolerances 172 includes tolerances for wear (abrasion, warping, delaminating, etc.) of the component 110 and for damage (punctures, rips, etc.) to the component 110. As an illustrative example, the in-service tolerances 172 include a degree of warping tolerance. As another example, the in-service tolerances 172 include a depth tolerance of a puncture and a corresponding cross-sectional area tolerance of the puncture. Different depth puncture tolerances may have different corresponding cross-sectional area tolerances. In some implementations, the in-service tolerances 172 include "positive" or "acceptable" tolerances. To illustrate, the positive tolerances indicate a dimension at which the component 110 can be repaired, can be reused, or both. For example, the positive tolerance indicates when a structural characteristic of the component 110 satisfies an operational threshold. Additionally or alternatively, the in-service tolerances 172 include "negative" or "replace" tolerances. To illustrate, the negative tolerances indicate a dimension at which the component 110 cannot be repaired, cannot be reused, or both. For example, the negative tolerance indicates when a structural characteristic of the component 110 would fail to satisfy an operational threshold.

The in-service tolerances 172 are generated after the as-designed (e.g., original or manufacturing) tolerances 192 are determined during design and manufacture of the component. The in-service tolerances 172 are generated based on analysis and testing of the component 110 and operational thresholds (e.g., a load threshold, a fatigue threshold, etc.). For example, the in-service tolerances 172 are determined based on a measurement of at least a second used component of the particular component type and an evaluation of structural characteristics of the second used component. The evaluation includes simulated analysis, non-destructive testing, destructive testing, or a combination thereof.

The computing device 114 is also configured to perform a comparison of the 3D measurement data 162 to the in-service tolerances 172 associated with a particular component type of the component 110. For example, the processor 132 determines dimensions of the component 110 based on the 3D measurement data 162 and compares the dimensions of the component 110 to the in-service tolerances 172. Alternatively, the computing device 114 is configured to perform a comparison of 3D model data 164 (generated based on the 3D measurement data 162) to the in-service tolerances 172.

The computing device 114 is further configured to generate the component disposition output 182 based on the comparison. The component disposition output 182 output indicates one or more of whether the component 110 is to be reused, evaluated, repaired, or replaced (e.g., scrapped). To illustrate, the processor 132 generates the component disposition output 182 indicating the used component is to be reused when the dimensions of the component 110 satisfy the in-service tolerances 172. As another illustration, the processor 132 generates the component disposition output 182 indicating the used component is to be evaluated when one or more of the dimensions of the component 110 fail to satisfy the in-service tolerances 172.

The display 136 is configured to output the component disposition output 182. When the component disposition output 182 output indicates that the component 110 is to be re-used, the component 110 may be installed in the platform 108 or another platform (e.g., another platform of the same platform type). In a particular implementation, the component disposition output 182 indicates a suggested repair parameter (e.g., a type of repair, an amount of repair, etc.).

In FIG. 1, the measuring system 102 further includes a network interface 118 configured to communicate with the structural analysis device 104 and the database 106. To illustrate, the measuring system 102 is configured to transmit the 3D measurement data 162, the 3D model data 164, or both, to a remote device (e.g., the structural analysis device 104). In some implementations, the measuring system 102 transmits the 3D measurement data 162, the 3D model data 164, or both, to the structural analysis device 104 when the component disposition output 182 indicates that at least one measurement of the component 110 does not satisfy the in-service tolerances 172 or indicates that the component 110 is to be evaluated. The measuring system 102 is configured to receive the in-service tolerances 172, in-service tolerance updates, or both, from the database 106. Additionally or alternatively, the measuring system 102 is configured to receive the tolerance updates from the structural analysis device 104. The network interface 118 may include or correspond to a wireless network interface, a wired network interface, or both. In a particular implementation, the network interface 118 is included in the computing device 114.

The structural analysis device 104 is configured to perform an evaluation of structural characteristics of 3D models of used components to generate data indicating at least one structural characteristic of the used components. In some implementations, the structural analysis device 104 is configured to compare the at least one structural characteristic to at least one structural characteristic threshold of the component 110. The structural analysis device 104 is configured to generate a second component disposition output. The second disposition output may indicate whether the component 110 is to be reused, repaired, or scrapped.

The structural analysis device 104 includes a processor 142, a memory 144, and a network interface 148. The memory 144 is configured to store a simulation application 146, the 3D measurement data 162, and the 3D model data 164. The processor 142 is configured to execute the simulation application 146. In some implementations, the simulation application 146 is configured to generate the 3D model data 164 based on the 3D measurement data 162. In other implementations, the structural analysis device 104 receives the 3D model data 164 from the computing device 114. In a particular implementation, the simulation application 146 includes a computer-aided engineering (CAE) application, a computer-aided manufacturing (CAM) application, or a product lifecycle management (PLM) application, such as Catia®, a registered trademark of Dassault Systemes, or Siemens NX® (previously known as Unigraphics), a registered trademark of Siemens PLM Software.

The simulation application 146 is configured to perform simulated structural analysis (e.g., finite element analysis, static analysis, etc.) on the 3D model data 164 to generate the data indicating at least one structural characteristic of the component 110. For example, the simulation application 146 may perform finite element analysis and static analysis to generate a load rating, a fatigue rating, or both. The simulation application 146 is configured to compare the at least one structural characteristic to at least one structural characteristic threshold of the component 110. For example, the load rating is compared to a load threshold (e.g., 1.5 times an operational load experienced by the component 110 while the platform 108 is in operation). Additionally or alternatively, the fatigue rating is compared to a fatigue threshold (e.g., a number of cycles until next inspection or retirement of the component). The load rating and the fatigue rating may be stored on the memory 144. Additionally or alternatively, the load rating and the fatigue rating may be retrieved or received from the database 106. In other implementations, the at least one structural characteristic is compared to the at least one structural characteristic threshold of the component 110 by a user.

In some implementations, the simulation application 146 is configured to generate a second component disposition output based on the comparison (e.g., a second comparison). In such implementations, the structural analysis device 104 sends the second component disposition output to the measuring system 102 via the network interface 148. The second component disposition output may indicate that the component 110 meets or exceeds operating and safety thresholds and is approved for reuse (e.g., continued service). In other implementations, the simulation application 146 is configured to generate output data that is used to determine or generate the second component disposition output. In such implementations, the second component disposition output may be generated based on user input. Additionally or alternatively, the second component disposition output may be generated by the measuring system 102 based on the output data.

Figure 4:
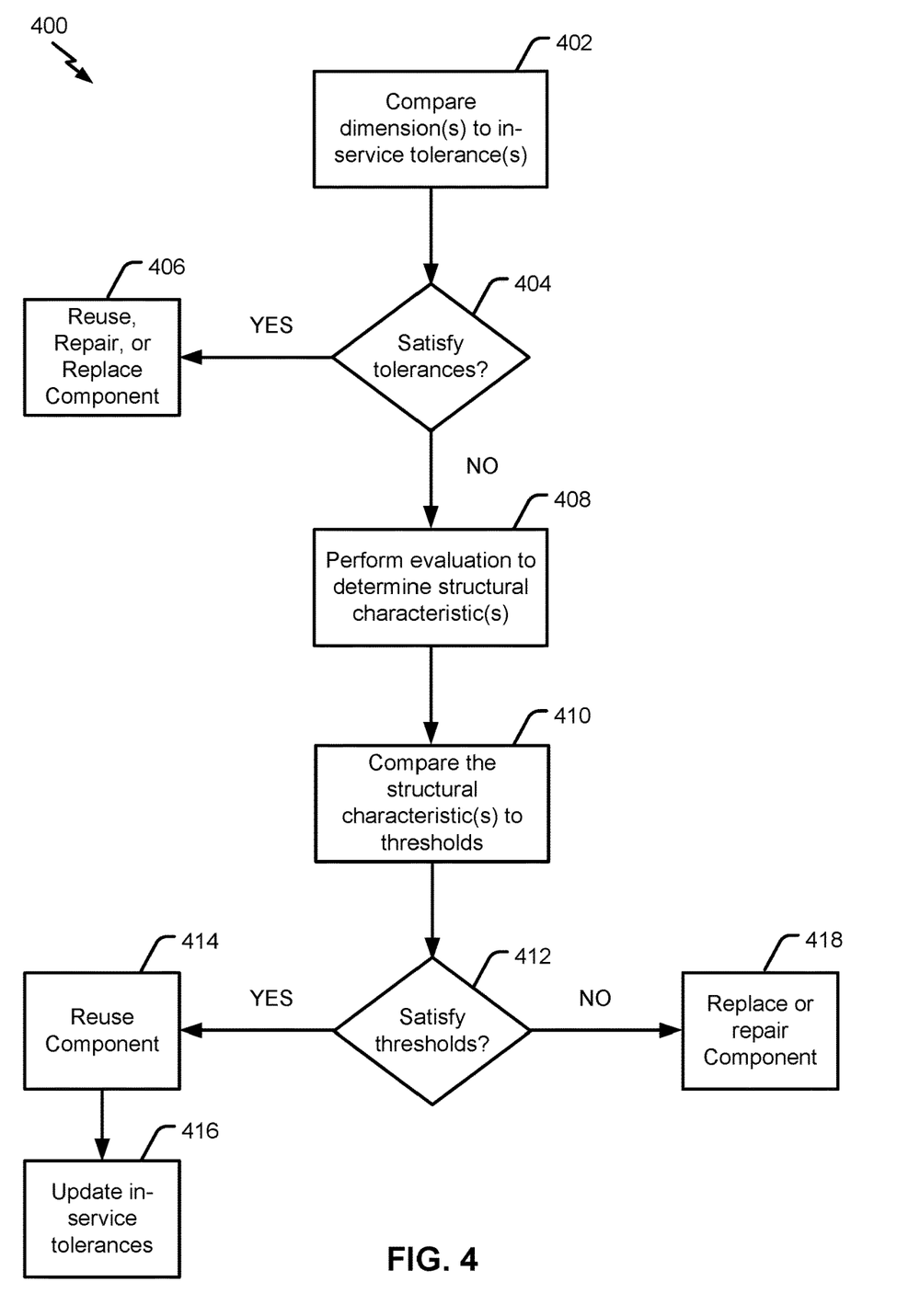
FIG. 4 is a flow diagram of another example of a method for performing an evaluation of a used component.

In some implementations, the structural analysis device 104 is further configured to generate a tolerance update 174 based on the dimensions of the component 110, the in-service tolerances 172, or both, as described further with reference to FIG. 4. The in-service tolerances 172 represent minimum or maximum dimensions of previously evaluated components that meet or exceed operating and safety thresholds. The tolerance update 174 represents an updated minimum or maximum dimension that meets or exceeds operating and safety thresholds based on the evaluation of the component 110. Additionally or alternatively, the in-service tolerances 172 represent the minimum or maximum dimensions of previously evaluated components that do not meet operating and safety thresholds.

The tolerance update 174 may be generated responsive to performing the second comparison. For example, the structural analysis device 104 generates the tolerance update 174 based on the determined structural characteristics satisfying the thresholds (e.g., meeting or exceeding operating and safety thresholds). Additionally or alternatively, the tolerance update 174 is generated responsive to the generation of the second component disposition. For example, the structural analysis device 104 generates the tolerance update 174 indicating that the component 110 is to be repaired or reused. The tolerance update 174 indicates a new in-service tolerance for the component 110 or indicates a modification to an existing in-service tolerance or an as-designed tolerance of the as-designed tolerances 192. For example, a particular tolerance update may indicate a new volume in-service tolerance (e.g., 221 inches cubed), a modification (e.g., 4.8 inches to 4.6 inches) to an existing height in-service tolerance, or both.

In such implementations where the structural analysis device 104 generates the tolerance update 174, the structural analysis device 104 sends the tolerance update 174 to the database 106 via the network interface 148. In a particular implementation, the structural analysis device 104 sends the tolerance update 174 to the database 106 based on the structural analysis or the second component disposition output indicating that the component 110 meets or exceeds operating and safety thresholds and is approved for reuse (e.g., continued service). Additionally, the structural analysis device 104 may send the tolerance update 174 to the measuring system 102 via the network interface 148. In other implementations, the measuring system 102 generates the tolerance update 174 responsive to receiving the second disposition output, output data, user input, or a combination thereof.

The database 106 includes a processor 152, a memory 154, and a network interface 158. The database 106 is configured to store and update the in-service tolerances 172. For example, the processor 152 is configured to generate or modify the in-service tolerances 172 based on the tolerance update 174. The database 106 is configured to be accessible to the measuring system 102 (e.g., the computing device 114) and the structural analysis device 104. In some implementations, the database 106 is configured to store 3D measurement data, such as the 3D measurement data 162. The database 106 may store, sort, retrieve, or a combination thereof, the 3D measurement data based on corresponding metadata. In such implementations, the database 106 may also store disposition information related to the 3D measurement data 162, such as a disposition indicated by a corresponding component disposition output. In a particular implementation, the disposition information is stored in the metadata of the corresponding 3D measurement data. In some implementations, the database 106 is configured to store 3D measurement data for components that are indicated as acceptable for reuse by a corresponding component disposition output. In such implementations, the database 106 may not store 3D measurement data for components that are not indicated as acceptable for reuse.

The network interface 158 is configured to communicate with the measuring system 102 (e.g., the computing device 114) and the structural analysis device 104. For example, the database 106 receives tolerance updates from the measuring system 102 (e.g., the computing device 114), the structural analysis device 104, or both. Additionally, the database 106 may send or push (e.g., send responsive to receiving the tolerance updates) the tolerance updates to the measuring system 102 (e.g., the computing device 114), the structural analysis device 104, or both.

During operation, the measuring device 112 measures (or scans) the component 110 using the sensor 126 and generates the 3D measurement data 162. The computing device 114 receives the 3D measurement data 162 via the interface 116. The computing device 114 compares the 3D measurement data 162 to the in-service tolerances 172 based on a type (e.g., component type, platform type, or both) of the component 110. Alternatively, the computing device 114 generates the 3D model data 164 based on the 3D measurement data 162 and compares the 3D model data 164 to the in-service tolerances 172 based on the type (e.g., component type, platform type, or both) of the component 110. To illustrate, the processor 132 determines dimensions of the component 110 from the 3D measurement data 162 or the 3D model data 164. The processor 132 compares the dimensions of the component 110 to the in-service tolerances 172 (e.g., a set of in-service tolerances of the in-service tolerances 172 corresponding to a type of the component 110). The computing device 114 generates the component disposition output 182 based on the comparison and displays the component disposition output 182 via the display 136. To illustrate, when the dimensions of the component 110 satisfy (e.g., are within) the in-service tolerances 172, the component disposition output 182 indicates that the component 110 is to be reused (e.g., reinstalled in the platform 108, installed in another similar platform, or not be repaired or replaced).

When one or more dimensions of the component 110 exceed (e.g., do not satisfy) the in-service tolerances 172, the component disposition output 182 indicates that the component 110 is to be evaluated, repaired, or replaced (e.g., or scrapped). For example, the component disposition output 182 indicates that the component 110 is to be evaluated when a length dimension of the component 110 does not satisfy (e.g., is not within a range of acceptable length values) the in-service tolerances 172 or when no corresponding in-service tolerance exists. As another example, the component disposition output 182 indicates that the component 110 is to be repaired when the length dimension of the component 110 does not satisfy (e.g., is not within) a first length tolerance of the in-service tolerances 172 and satisfies (e.g., is within a range of repairable length values) a second length tolerance of the in-service tolerances 172. As yet another example, the component disposition output 182 indicates that the component 110 is to be replaced when the length dimension of the component 110 does not satisfy the first or the second length tolerance, as described with reference to FIGS. 4-6.

To evaluate the component 110, the computing device 114 sends the 3D measurement data 162 or the 3D model data 164 to the structural analysis device 104 via the network interface 118. In implementations where the 3D measurement data 162 is received by the structural analysis device 104, the structural analysis device 104 generates the 3D model data 164 based on the 3D measurement data 162. To illustrate, the processor 142 executes the simulation application 146 to generate the 3D model data 164. The structural analysis device 104 performs a simulated structural analysis on the 3D model data 164 utilizing the simulation application 146 to determine one or more structural characteristics of the component 110. For example, the processor 142 executes the simulation application 146 to perform a finite element analysis, a static analysis, or a combination thereof, to determine a load rating (e.g., a shear rating, a strain rating, or both), a fatigue rating (e.g., a number of cycles), or a combination thereof, of the component 110. Alternatively, the component 110 is evaluated using non-destructive testing.

The structural analysis device 104 generates a second component disposition output based on comparing the determined structural characteristics of the component 110 to the operational thresholds. To illustrate, the structural analysis device 104 performs a comparison of the load rating and the fatigue rating to the load threshold and the fatigue threshold. The structural analysis device 104 sends the second component disposition output to the measuring system 102 via the network interface 148. The computing device 114 displays the second component disposition output. The second component disposition output may indicate that the component 110 is to be reused, repaired, or replaced. For example, when the load rating satisfies (e.g., exceeds) the load threshold and the fatigue rating satisfies (e.g., exceeds) the fatigue threshold, the second disposition output indicates that the component 110 is to be reused. As another example, when either the load rating fails to satisfy (e.g., fails to exceed) the load rating or the fatigue rating fails to satisfy (e.g., fails to exceed) the fatigue threshold, the second disposition output indicates that the component 110 is to be repaired or replaced.

In some implementations, the structural analysis device 104 generates the tolerance update 174 based on the dimensions of the component 110. For example, when the load rating satisfies (e.g., exceeds) the load threshold and the fatigue rating satisfies (e.g., exceeds) the fatigue threshold, the structural analysis device 104 generates the tolerance update 174 based on the dimension of the component 110. As another example, when either the load rating fails to satisfy (e.g., fails to exceed) the load rating or the fatigue rating fails to satisfy (e.g., fails to exceed) the fatigue threshold, the structural analysis device 104 generates the tolerance update 174 (e.g., a tolerance update for a negative tolerance) based on the dimension of the component 110. The structural analysis device 104 sends the tolerance update 174 to the database 106 via the network interface 148. The database 106 modifies (e.g., updated) the in-service tolerances 172 based on the tolerance update 174. Additionally, the structural analysis device 104 may send the tolerance update 174 to the measuring system 102 via the network interface 148. Thus, the dimensions of the component 110 are stored as the in-service tolerances 172 for comparison against components evaluated in the future.

When the component 110 is to be reused, the component 110 is reinstalled in the platform 108 or installed in another similar platform. When the component 110 is to be repaired (e.g., refurbished), the component 110 may be repaired by hand or by an automated machine. In some implementations, the second disposition output indicates a parameter of the repair. For example, the second disposition output indicates a type of repair, a dimension of the repair, or a combination thereof. To illustrate, the second disposition output indicates that a 1 inch fill repair is to be performed on the component 110. After the component 110 is repaired, the component 110 may be measured (remeasured) by the measuring system 102 and a third comparison may be performed to verify that the dimensions of the repaired component are within the in-service tolerances 172. If the dimensions of the repaired component are not within the in-service tolerances 172, the repaired component may be scrapped or reevaluated (e.g., by the structural analysis device 104). In a particular implementation, the measuring system 102 is located at an airport or a maintenance facility, and the structural analysis device 104 is located at an engineering facility. In other implementations, the measuring system 102 and the structural analysis device 104 are integrated into one system.

By using the measuring device 112 to determine the 3D measurement data 162, an accuracy of the measurements of the component 110 is increased (e.g., the likelihood of human error is reduced) and more measurement data can be generated within a particular time period as compared to measuring by hand. Additionally, using the measuring device 112 to determine the 3D measurement data 162 may reduce occurrences of remeasuring the component 110 because of incomplete data. Further, by determining the 3D measurement data 162, a 3D model can be generated that enables comparing dimensions of the component 110 to the in-service tolerances 172. Accordingly, an accuracy of models and simulations of components, generated based on 3D measurement data, is increased and inspection and maintenance cycle time may be decreased.

By using in-service tolerances, an amount of evaluations (e.g., simulated analysis of 3D models or tests of physical components) of components may be reduced and maintenance cycle time may be decreased. For example, when a particular used component satisfies previously established in-service tolerances (based on evaluations of similar components), the particular component may be reused without evaluation, thus reducing maintenance cycle time. As more components are evaluated by the system 101, the likelihood that a particular component is to be evaluated decreases (e.g., it is more likely that a new component satisfies existing in-service tolerances established based on previous evaluations).

In addition, if the component 110 on the platform 108 has been evaluated by the system 101 previously, analysis can be done prior to submitting (e.g., induction of) the platform 108 for inspection. For example, if the component 110 has been previously repaired, it is possible to determine that the previous repair combined with visual evidence of new wear or damage renders the component unfit for further repair prior to induction. In this case, a replacement component (which may have long acquisition or lead times) can be ordered prior to submitting the platform 108 for inspection to allow the platform 108 to remain in service and reduce downtime of the platform 108. Additionally, in-service tolerances for new components and new platform may be generated based on 3D measurements, evaluations, in-service tolerances, or a combination thereof, of other similar components and similar platforms.

Figure 2:
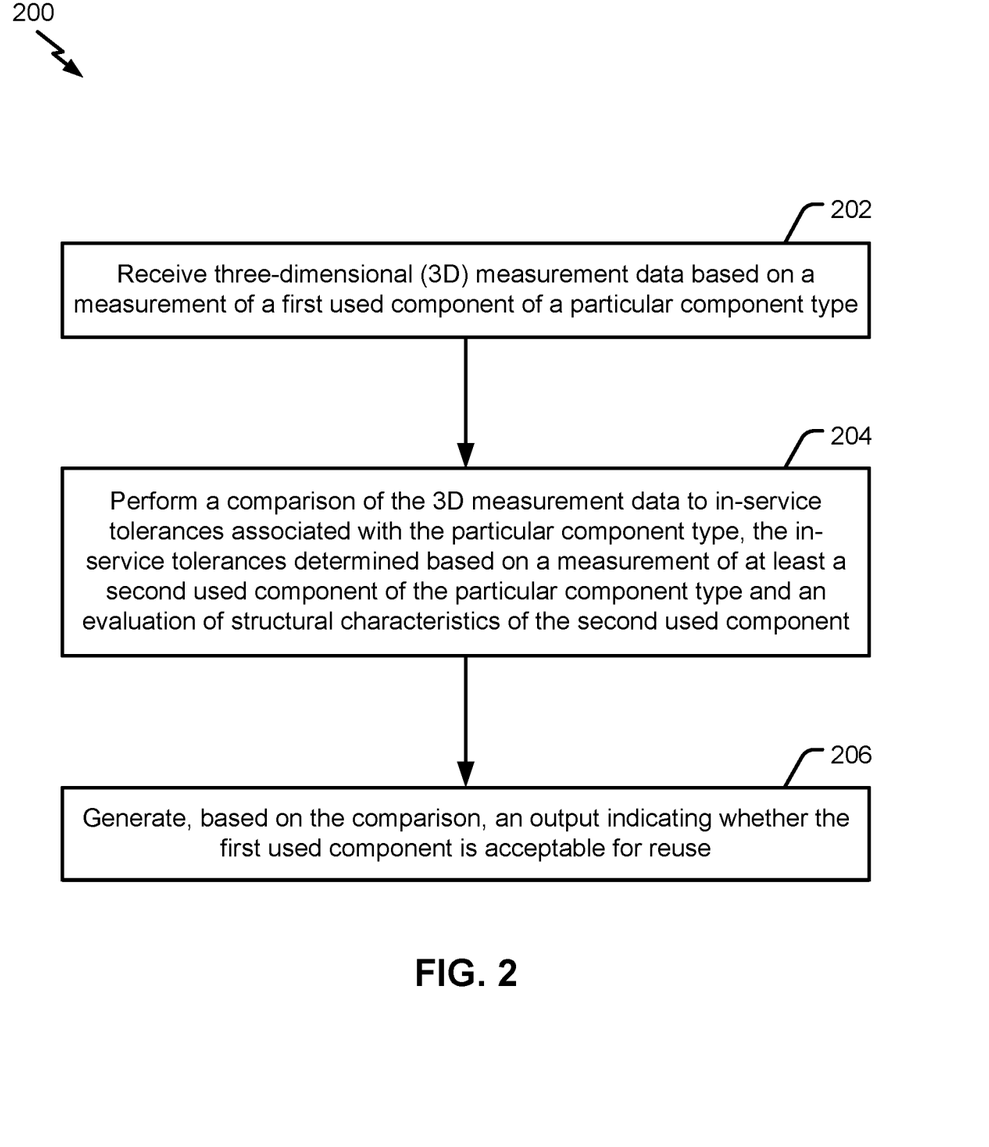
FIG. 2 is a flow chart of an example of a method for evaluating a component for reuse.

FIG. 2 illustrates a method 200 of evaluating a used component for reuse (e.g., continued service). The method 200 may be performed by the system 101, the measuring system 102, the computing device 114, or the processor 132 of FIG. 1. The method 200 includes, at 202, receiving three-dimensional (3D) measurement data based on a measurement of a first used component of a particular component type. For example, the measuring device 112 measures the component 110 and generates the 3D measurement data 162. The computing device 114 receives the 3D measurement data 162 from the measuring device 112 or a memory, such as the memory 124 or the memory 134, as explained with reference to FIG. 1. The measuring device 112 may include or correspond to a laser measurement device, an optical measurement device, a coordinate measurement machine, or a contact based measurement device.

The method 200 of FIG. 2 includes, at 204, performing a comparison of the 3D measurement data to in-service tolerances associated with the particular component type, the in-service tolerances determined based on a measurement of at least a second used component of the particular component type and an evaluation of structural characteristics of the second used component. For example, the measuring device 112 performs a comparison of the 3D measurement data 162 or the 3D model data 164 (generated based on the 3D measurement data 162) to the in-service tolerances 172, as explained with reference to FIG. 1. The second used component includes or corresponds to a previously evaluated used component. The second used component may be evaluated by the structural analysis device 104 of FIG. 1 and is evaluated prior to performing the comparison, as described with reference to FIGS. 1 and 3. In some implementations, the evaluation includes a result of a simulated structural analysis of a 3D model of the second used component, a non-destructive test of the second used component, a destructive test of the second used component, or a combination thereof. In some implementations, the structural characteristics include a load rating and a fatigue rating (e.g., a number of cycles or a fatigue load limit).

In some implementations, the evaluation of the second component is performed based on determining that second 3D measurement data exceeds a particular as-designed tolerance of as-designed tolerances. One or more particular in-service tolerances of the in-service tolerances 172 are determined based on a simulation of a 3D model of the second component satisfying a load threshold and a fatigue threshold.

The in-service tolerances may include or corresponds to subset of in-service tolerances of the in-service tolerances 172. The subset of in-service tolerances may be associated with the particular component type, similar component types, similar platforms, or both. The in-service tolerances 172 differ from as-designed or original tolerances and the in-service tolerances 172 have been generated (and updated) based on previous evaluations of components of similar types and of similar platforms. The evaluations of the components of similar component types and of similar platforms may be performed by multiple different devices (e.g., the structural analysis device 104 of FIG. 1 and other structural analysis devices of the system 101).

The method 200 of FIG. 2 includes, at 206, generating, based on the comparison, an output indicating whether the first used component is acceptable for reuse. For example, the computing device 114 generates the component disposition output 182 based on the comparison, as described with reference to FIG. 1. The component disposition output 182 indicates whether the first used component meets the in-service tolerances 172 previously determined for that type of component. The component disposition output 182 may indicate that the component 110 is to be reused, evaluated, repaired, or replaced (e.g., scrapped), as described with reference to FIG. 1.

In some implementations, when the output indicates that the first used component is acceptable for reuse, the first used component is installed on a platform. In a particular implementation, the platform is an aircraft. In other implementations, the platform is a spacecraft, a ship, a building, a bridge, an oil rig, a power plant, or a chemical plant.

In some implementations, the method 200 further includes sending the 3D measurement data to a structural analysis device to perform a second evaluation of structural characteristics of the first used component based on the 3D measurement data when the output indicates that first used component is not acceptable for reuse. For example, the computing device 114 sends the 3D measurement data 162 to the 3D model data 164 to the structural analysis device 104, as described with reference to FIG. 1.

In other implementations, the method 200 further includes, when the output indicates that first used component is not acceptable for reuse, performing a second evaluation of structural characteristics of the first used component. For example, the computing device 114 performs the second evaluation on the 3D measurement data 162 to the 3D model data 164, as described with reference to FIG. 1.

In some implementations performing the second evaluation includes performing a finite element analysis to determine a load rating and a fatigue rating. Performing the second evaluation also includes performing a second comparison of the load rating and the fatigue rating to a load threshold and a fatigue threshold. Performing the second evaluation further includes outputting a result of the second comparison.

In some implementations, the method 200 further includes, generating, based on a second evaluation of structural characteristics of the first used component, a second output indicating that the first used component is acceptable for reuse.

In some implementations, the method 200 further includes, sending update data to a database. The update data causes the database to update the in-service tolerances based on the second evaluation, the 3D measurement data, or both. For example, the computing device 114 or the structural analysis device 104 generates the tolerance update 174 and either of the computing device 114 or the structural analysis device 104 sends the tolerance update 174 to the database 106, as described with reference to FIG. 1.

In some implementations, the method 200 further includes, displaying, based on a second evaluation of structural characteristics of the first used component, a second output indicating that the first used component is to be repaired. For example, the display 136 of the computing device 114 outputs or displays the second component disposition output, as described with reference to FIG. 1. In some implementations, an output (e.g., the first output or the second output) further indicates that the first used component is to be repaired. In a particular implementation, the output further indicates a repair parameter, as described with reference to FIG. 1.

In some implementations, the method 200 further includes, in response to the second output indicating that first used component is not acceptable for reuse, generating or updating a rejection threshold. For example, the computing device 114 or the structural analysis device 104 may generate or update a particular in-service tolerance that indicates when the component 110 has a dimension or a structural characteristic that is not acceptable for reuse, as described with reference to FIG. 1.

In a particular implementation, the memory 134 stores processor-executable instructions that, when executed by a processor, cause the processor 132 to receive the 3D measurement data 162 based on a measurement of the component 110 of a particular component type. The instructions also cause the processor 132 to perform a comparison of the 3D measurement data 162 to the in-service tolerances 172 associated with the particular component type. The in-service tolerances 172 are determined based on measurement of at least a second used component of the particular component type and evaluation of structural characteristics of the second used component. The instructions further cause the processor 132 to generate, based on the comparison, an output indicating whether the first used component is acceptable for reuse. In some implementations, the in-service tolerances comprise multi-dimensional tolerances (e.g., area or volume tolerances).

Figure 3:
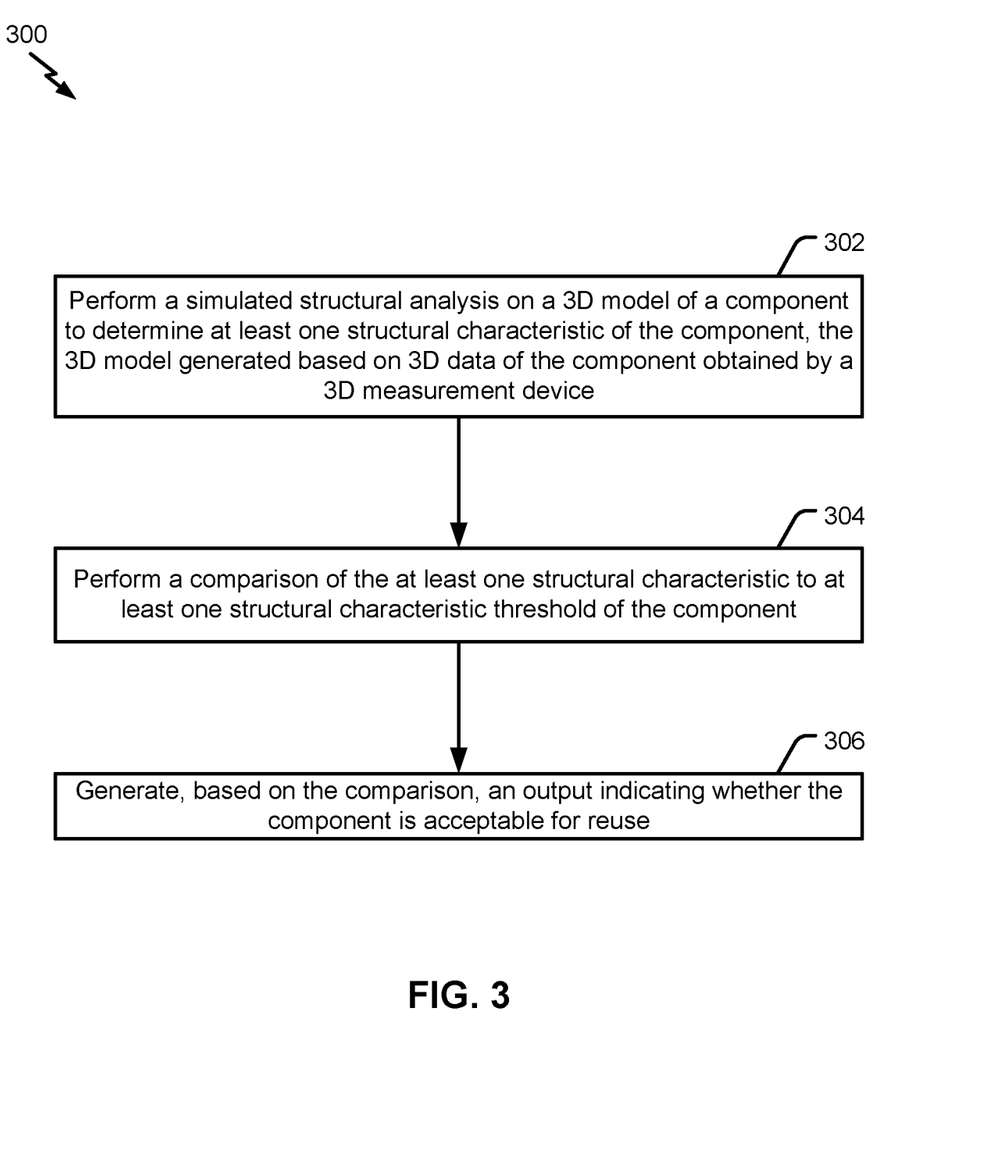
FIG. 3 is a flow chart of an example of a method for performing an evaluation of structural characteristics of a component.

FIG. 3 is a flow chart of an example of a method 300 for performing an evaluation of structural characteristics of a component. The method 300 may be performed by the system 101, the measuring system 102, the computing device 114, the processor 132, the structural analysis device 104, or the processor 142 of FIG. 1. The method 300 includes, at 302, performing a simulated structural analysis on a 3D model of a component to determine at least one structural characteristic of the component, the 3D model generated based on 3D data of the component obtained by a 3D measurement device. For example, the computing device 114 or the structural analysis device 104 performs a finite element analysis and a static analysis on the 3D model data 164 using the simulation application 146 to generate structural characteristics, as described with reference to FIG. 1.

The method 300 includes, at 304, performing a comparison of the at least one structural characteristic to at least one structural characteristic threshold of the component. For example, the computing device 114 or the structural analysis device 104 compares the load rating to the load threshold and compares the fatigue rating to the fatigue threshold, as described with reference to FIG. 1. In other implementations, the comparison is performed by a user.

The method 300 includes, at 306, generating, based on the comparison, an output indicating whether the component is acceptable for reuse. For example, the computing device 114 or the structural analysis device 104 generates the second component disposition output, as described with reference to FIG. 1. In some implementations, the second component disposition output is generated based on user input.

FIG. 4 is a flow diagram 400 of an example of a method of performing an evaluation of a used component (e.g., the component 110). The diagram 400 illustrates operations that may be performed by the computing device 114. The diagram 400 includes, at 402, comparing dimensions of the component 110 to the in-service tolerances 172. The dimensions may be determined from the 3D measurement data 162 or the 3D model data 164. The diagram 400 includes, at 404, determining whether the dimensions satisfy the in-service tolerances 172. The diagram 400 includes, at 406, responsive to determining that the dimensions satisfy the in-service tolerances 172, generating an output indicating that the component 110 should be reused, repaired, or replaced, as described further with reference to FIGS. 5 and 6.

The diagram 400 includes, at 408, responsive to determining that the dimensions satisfy the in-service tolerances 172, performing an evaluation to determine structural characteristics of the component 110. The diagram 400 includes, at 410, comparing the structural characteristics of the component 110 to the structural characteristics thresholds. The diagram 400 includes, at 412, determining whether the structural characteristics satisfy the structural characteristic thresholds, as described with reference to FIGS. 1 and 3.

The diagram 400 includes, at 414, responsive to determining that the structural characteristics satisfy the structural characteristic thresholds, generating an output indicating that the component 110 should be reused. The diagram 400 includes, at 416, responsive to determining that the structural characteristics satisfy the structural characteristic thresholds, generating one or more tolerance updates based on the dimensions of the component 110, the in-service tolerances 172, or both. For example, dimensions of the component 110 are compared to the in-service tolerances 172 to determine which particular dimension(s) of component 110 exceed the in-service tolerances 172. Alternatively, the particular in-service tolerances not satisfied during the comparison of the dimensions to the in-service tolerances 172 are updated. The tolerance updates 174 may indicate a change to the in-service tolerances 172 or a replacement value for the in-service tolerances 172. For example, when modifying a particular in-service tolerance of 1 inch to 3 inches, the tolerance update 174 may include a change value of "+2 inches" (e.g., the original tolerance of 1 inch plus +2 inches=3 inches) or a replacement value of "3 inches". The one or more tolerance updates are sent to the database 106 and used to update the in-service tolerances 172.

The diagram 400 includes, at 418, responsive to determining that the structural characteristics fail to satisfy the structural characteristic thresholds, generating an output indicating that the component 110 should be repaired or replaced, as described with reference to FIGS. 1 and 3. In some implementations when the component 110 is indicated as to be repaired, non-destructive testing is performed on the component 110 to validate the simulated analysis. Additionally or alternatively, when the component 110 is indicated as to be replaced, destructive testing is performed on the component 110 to validate the simulated analysis.

Figure 5:
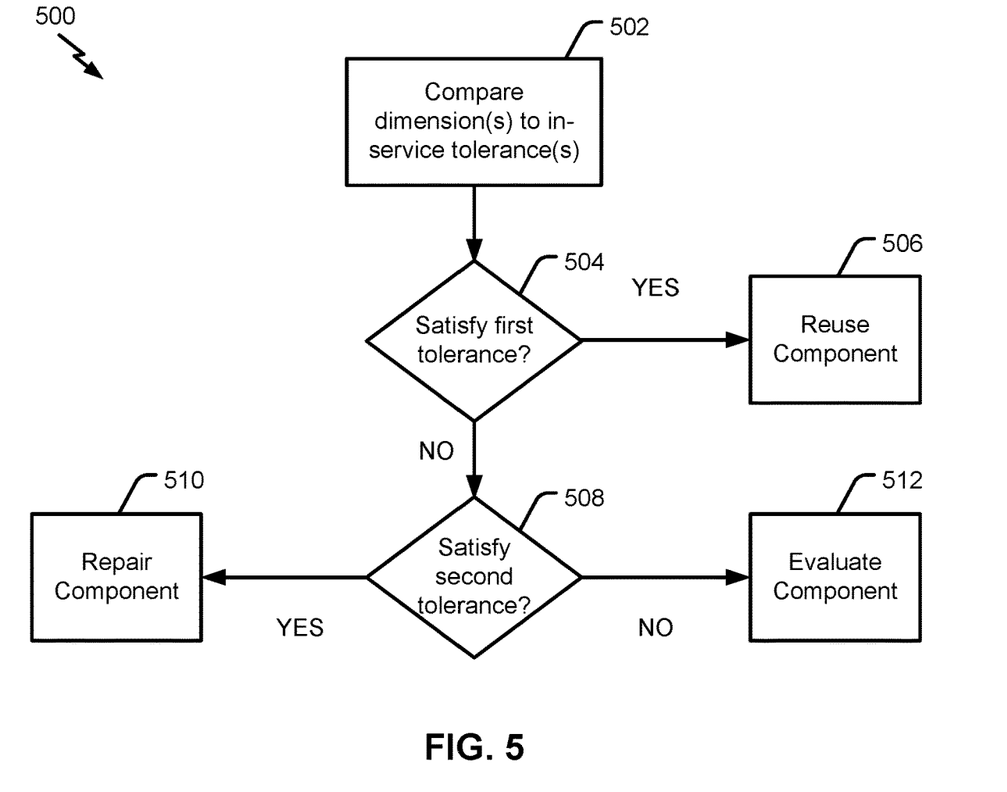
FIG. 5 is a flow diagram of an example of comparing dimensions of a used component to in-service tolerances.

FIG. 5 is a flow diagram 500 of an example of comparing dimensions of a used component to in-service tolerances. The diagram 500 illustrates operations that may be performed by the computing device 114. The diagram 500 includes, at 502, comparing dimensions of the component 110 to the in-service tolerances 172. The dimensions may be determined from the 3D measurement data 162 or the 3D model data 164. The diagram 500 includes, at 504, determining whether the dimensions satisfy a first tolerance(s) of the in-service tolerances 172. The diagram 500 includes, at 506, responsive to determining that the dimensions satisfy the first tolerance(s) of the in-service tolerances 172, generating an output indicating that the component 110 should be reused.

The diagram 500 includes, at 508, responsive to determining that the dimensions satisfy the first tolerance(s) of the in-service tolerances 172, determining whether the dimensions satisfy a second tolerance(s) of the in-service tolerances 172. The second tolerance(s) are associated with values or ranges of values that indicate that the component 110 is repairable and that structural characteristics of the repaired component 110 satisfy structural characteristic thresholds. The diagram 500 includes, at 510, responsive to determining that the dimensions satisfy the second t olerance(s) of the in-service tolerances 172, generating an output indicating that the component 110 should be repaired. The diagram 500 includes, at 512, responsive to determining that the dimensions do not satisfy the second tolerance(s) of the in-service tolerances 172, generating an output indicating that the component 110 should be evaluated.

Figure 6:
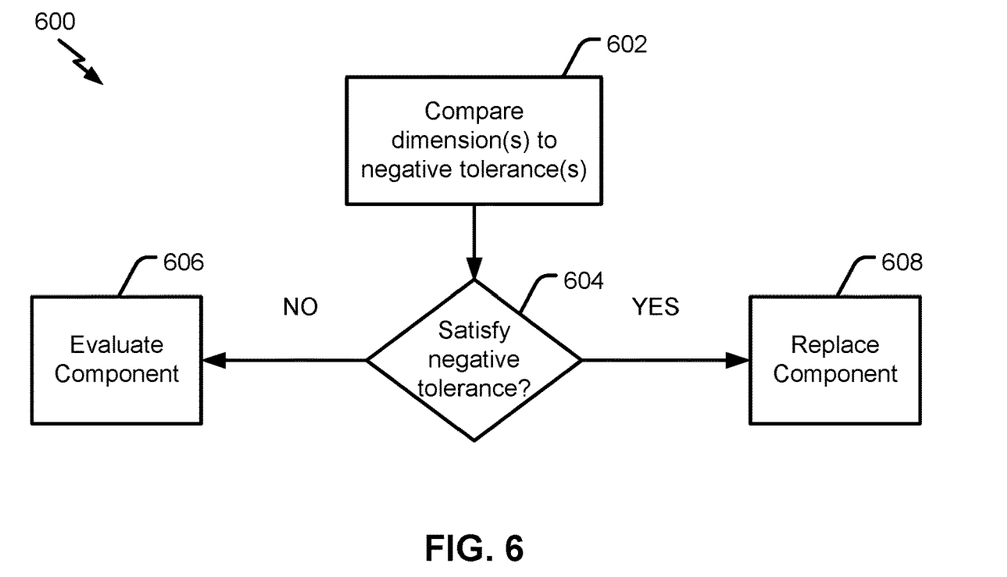
FIG. 6 is a flow diagram of another example of comparing dimensions of a used component to in-service tolerances.

FIG. 6 is a flow diagram 600 of another example of comparing dimensions of a used component (e.g., the component 110) to the in-service tolerances 172. The diagram 600 illustrates operations that may be performed by the computing device 114. The diagram 600 includes, at 602, comparing dimensions of the component 110 to a negative tolerance(s) of the in-service tolerances 172. The dimensions may be determined from the 3D measurement data 162 or the 3D model data 164. The diagram 600 includes, at 604, determining whether the dimensions satisfy the negative tolerance(s).

The diagram 600 includes, at 606, responsive to determining that the dimensions satisfy the negative tolerance(s), generating an output indicating that the component 110 should be repaired. In such implementations, the negative tolerance(s) are associated with values of dimensions (determined from previous evaluations) that cannot be repaired such that the structural characteristics of the repaired component 110 satisfy structural characteristic thresholds or with values of dimensions that cannot be repaired due to regulations, such as Federal Aviation Administration (FAA) regulations. Additionally or alternatively, the negative tolerance(s) are associated with values of dimensions that do not satisfy structural characteristic thresholds (e.g., before repairs are performed on the component 110). In some implementations, the negative thresholds correspond to a range of values.

The diagram 600 includes, at 608, responsive to determining that the dimensions satisfy the negative tolerance(s), generating an output indicating that the component 110 should be evaluated. In other implementations, the output indicates that the component 110 is to be replaced (e.g., scrapped). Comparing dimensions to negative threshold tolerances may further reduce evaluations and decrease maintenance cycle time. The dimensions may be compared to the negative thresholds before or after the dimension are compared other tolerances (e.g., positive tolerances or acceptable ranges of values) of the in-service tolerances 172.

Figure 7:
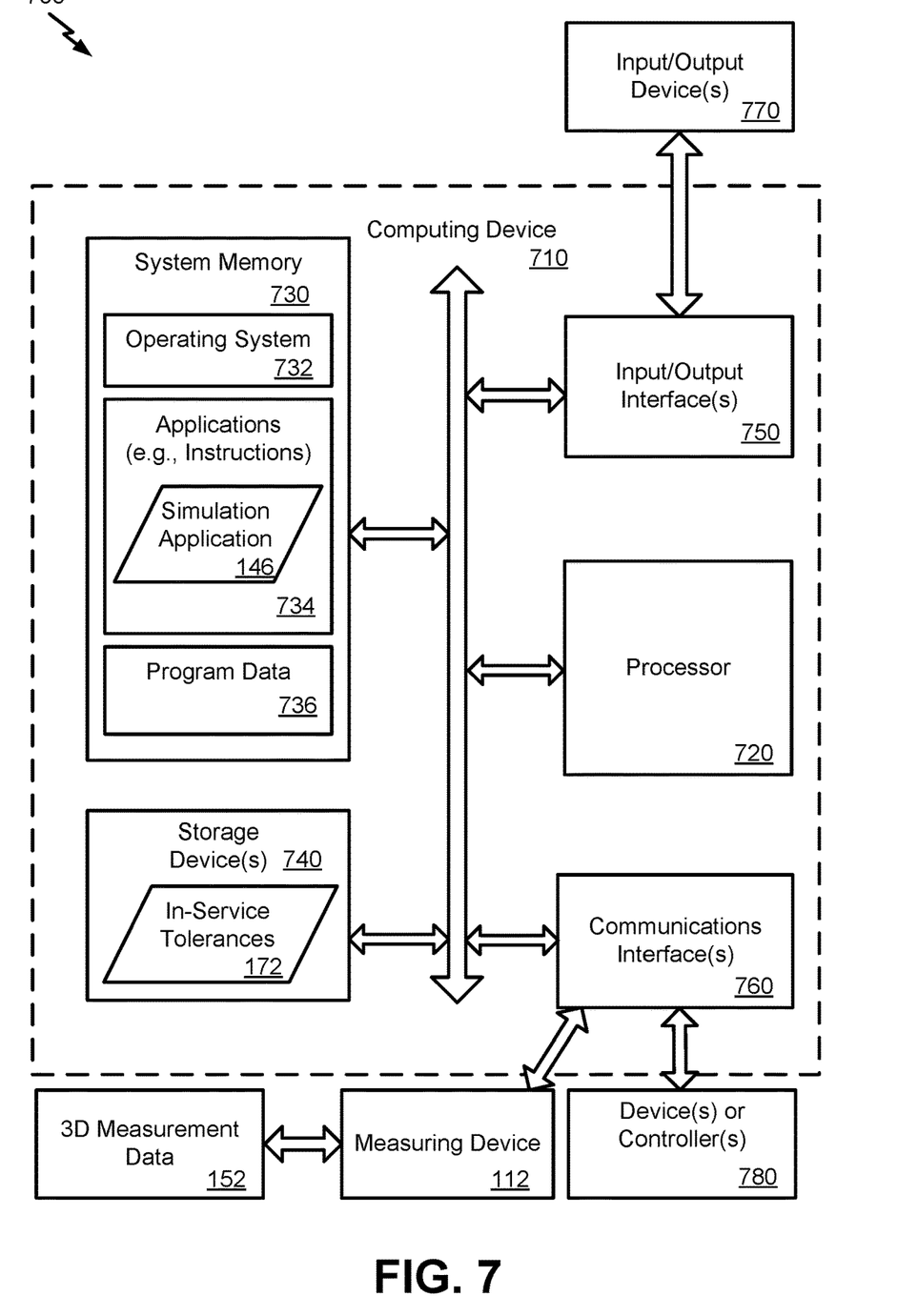
FIG. 7 is an illustration of a block diagram of a computing environment including a general purpose computing device configured to evaluate a component for reuse according to the present disclosure.

FIG. 7 is an illustration of a block diagram of a computing environment 700 including a general purpose computing device 710 configured to support embodiments of computer-implemented methods and computer-executable program instructions (or code) according to the present disclosure. For example, the computing device 710, or portions thereof, may execute instructions to perform the functions of the system 101 or functions of a portion of the system 101, such as the processor 122, the processor 132, the processor 142, or the processor 152. The instructions to control the system 101 (or of a portion of the system 101, such as the processor 122, the processor 132, the processor 142, or the processor 152) may include instructions to evaluate a component for reuse (e.g., continued service), perform an evaluation of structural characteristics of a component, or both. The instructions to control the system 101 (or the portion of the system 101) may also include instructions perform a comparison of the 3D measurement data to the in-service tolerance associated with the particular component type. The in-service tolerances are determined based on measurement of at least a second used component of the particular component type and evaluation of structural characteristics of the second used component. The instructions further cause the processor to generate, based on the comparison, an output indicating whether the first used component is acceptable for reuse. In some implementations, the in-service tolerances comprise multi-dimensional tolerances (e.g., area or volume tolerances). The computing device 710, or portions thereof, may further execute instructions according to any of the methods described herein, or to enable any of the methods described herein, such as the method 200 of FIG. 2 or the method 300 of FIG. 3.

The computing device 710 may include a processor 720. The processor 720 may communicate with the system memory 730, one or more storage devices 740, one or more input/output interfaces 750, one or more communications interfaces 760, or a combination thereof. In a particular embodiment, the processor 720 includes or corresponds to the processor 122, the processor 132, the processor 142, or the processor 152. The system memory 730 may include volatile memory devices (e.g., random access memory (RAM) devices), nonvolatile memory devices (e.g., read-only memory (ROM) devices, programmable read-only memory, and flash memory), or both. The system memory 730 may include an operating system 732, which may include a basic/input output system for booting the computing device 710 as well as a full operating system to enable the computing device 710 to interact with users, other programs, and other devices. The system memory 730 may include one or more applications 734 (e.g., the simulation application 146 of FIG. 1) which may be executable by the processor 720. For example, the one or more applications 734 may include instructions executable by the processor 720 to control the system 101 to generate the 3D model data 164 based on the 3D measurement data 162, to generate dimensions of the component 110 based on the 3D measurement data 162 or the 3D model data 164, and to generate the structural characteristics of the component 110 based on the 3D model data 164, or a combination thereof.

The processor 720 may also communicate with one or more storage devices 740, such as the memory 124, the memory 134, the memory 144, or the memory 154 of FIG. 1. For example, the one or more storage devices 740 may include nonvolatile storage devices, such as magnetic disks, optical disks, or flash memory devices. The storage devices 740 may include both removable and non-removable memory devices. The storage devices 740 may be configured to store an operating system, images of operating systems, applications, and program data. The storage devices 740 may also store the in-service tolerances 172, the tolerance update 174, or both. In a particular embodiment, the memory 730, the storage devices 740, or both, include tangible computer-readable media.

The processor 720 may communicate with one or more input/output interfaces 750 that enable the computing device 710 to communicate with one or more input/output devices 770 (such as the measuring device 112 of FIG. 1, the display 136, or both) to facilitate user interaction. The input/output interfaces 750 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 770 may include keyboards, pointing devices, displays, speakers, microphones, touch screens, and other devices. The processor 720 may detect interaction events based on user input received via the input/output interfaces 750. Additionally, the processor 720 may send a display to a display device (e.g., the measuring device 112, the display 136, or both) via the input/output interfaces 750.

The processor 720 may communicate with the measuring device 112, one or more devices 780, or a combination thereof, via the one or more communications interfaces 760. The one or more communications interfaces 760 may include wired Ethernet interfaces, IEEE 802 wireless interfaces, other wireless communication interfaces, or other network interfaces. The one or more devices 780 may include host computers, servers, workstations, and other computing devices.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   receiving three-dimensional (3D) measurement data based on a measurement of a first used component of a particular component type;
   performing a comparison of the 3D measurement data to in-service tolerances associated with the particular component type, the in-service tolerances determined based on a measurement of at least a second used component of the particular component type and an evaluation of structural characteristics of the second used component; and
   generating, based on the comparison, an output indicating whether the first used component is acceptable for reuse.

2. The method of claim 1, wherein the evaluation comprises a result of a simulated structural analysis of a 3D model of the second used component, a non-destructive test of the second used component, or a destructive test of the second used component.

3. The method of claim 1, wherein the structural characteristics comprise a load rating and a fatigue rating.

4. The method of claim 1, wherein, when the output indicates that the first used component is acceptable for reuse, the first used component is installed on a platform.

5. The method of claim 4, wherein the platform comprises an aircraft.

6. The method of claim 4, wherein the platform comprises a spacecraft, a ship, a building, a bridge, an oil rig, a power plant, or a chemical plant.

7. The method of claim 1, further comprising, when the output indicates that first used component is not acceptable for reuse, sending the 3D measurement data to a structural analysis device to perform a second evaluation of structural characteristics of the first used component based on the 3D measurement data.

8. The method of claim 1, further comprising, when the output indicates that first used component is not acceptable for reuse, performing a second evaluation of structural characteristics of the first used component.

9. The method of claim 8, wherein performing the second evaluation comprises:
   performing a finite element analysis to determine a load rating and a fatigue rating;
   performing a second comparison of the load rating and the fatigue rating to a load threshold and a fatigue threshold; and
   outputting a result of the second comparison.

10. The method of claim 1, further comprising generating, based on a second evaluation of structural characteristics of the first used component, a second output indicating that the first used component is acceptable for reuse.

11. The method of claim 10, further comprising sending update data to a database, wherein the update data causes the database to update the in-service tolerances based on the second evaluation, the 3D measurement data, or both.

12. The method of claim 1, further comprising displaying, based on a second evaluation of structural characteristics of the first used component, a second output indicating that the first used component is to be repaired.

13. The method of claim 1, wherein the output further indicates that the first used component is to be repaired.

14. The method of claim 1, wherein the evaluation of the second component is performed based on determining that second 3D measurement data exceeds a particular as-designed tolerance of as-designed tolerances, and wherein one or more particular in-service tolerances of the in-service tolerances are determined based on a simulation of a 3D model of the second component satisfying a load threshold and a fatigue threshold.

15. A system comprising:
a three-dimensional measuring device configured to generate three-dimensional (3D) measurement data based on a measuring a first used component of a particular component type; and
a computing device configured to:
perform a comparison of the 3D measurement data to in-service tolerances associated with the particular component type, the in-service tolerances determined based on measurement of at least a second used component of the particular component type and evaluation of structural characteristics of the second used component; and
generate, based on the comparison, an output indicating whether the first used component is acceptable for reuse.

16. The system of claim 15, further comprising a network interface configured to:

transmit the 3D measurement data, a 3D model generated based on the 3D measurement data, or both, to a remote device; and
receive the in-service tolerances, in-service tolerance updates, or both from a database, wherein the measurement device comprises a laser measurement device, an optical measurement device, or a contact based measurement device.

17. The system of claim 15, further comprising a database configured to store the in-service tolerances.

18. A non-transitory processor-readable medium storing processor-executable instructions that, when executed by a processor, cause the processor to:
receive three-dimensional (3D) measurement data based on a measurement of a first used component of a particular component type;
perform a comparison of the 3D measurement data to in-service tolerances associated with the particular component type, the in-service tolerances determined based on measurement of at least a second used component of the particular component type and evaluation of structural characteristics of the second used component; and
generate, based on the comparison, an output indicating whether the first used component is acceptable for reuse.

19. The non-transitory processor-readable medium of claim 18, wherein the in-service tolerances comprise length tolerances, width tolerances, height tolerances, area tolerances, volume tolerances, or a combination thereof.

20. The non-transitory processor-readable medium of claim 18, wherein the first used component has wear causing variance from an as-designed component.

* * * * *